Jan. 31, 1956   L. CONTRATTO   2,732,597
METHOD OF MAKING WOODEN STRUCTURAL ELEMENTS, IN PARTICULAR
FLOOR-COVERING SLABS AND A WOODEN STRUCTURAL ELEMENT MADE
ACCORDING TO THIS METHOD, IN PARTICULAR
A FLOOR COVERING SLAB

Filed Feb. 29, 1948

2 Sheets-Sheet 1

Inventor
L. Contratto
By Stuart Downing Aubild Attys.

Jan. 31, 1956

L. CONTRATTO 2,732,597

METHOD OF MAKING WOODEN STRUCTURAL ELEMENTS, IN PARTICULAR
FLOOR-COVERING SLABS AND A WOODEN STRUCTURAL ELEMENT MADE
ACCORDING TO THIS METHOD, IN PARTICULAR
A FLOOR COVERING SLAB

Filed Feb. 29, 1948

2 Sheets-Sheet 2

Inventor
L. Contratto
By Glascock Downing Seubold
Attys.

United States Patent Office 2,732,597
Patented Jan. 31, 1956

2,732,597

METHOD OF MAKING WOODEN STRUCTURAL ELEMENTS, IN PARTICULAR FLOOR-COVERING SLABS AND A WOODEN STRUCTURAL ELEMENT MADE ACCORDING TO THIS METHOD, IN PARTICULAR A FLOOR COVERING SLAB

Lorenz Contratto, Sisikon, Switzerland

Application February 29, 1948, Serial No. 12,174
In Sweden December 21, 1944

Section 1, Public Law 690, August 8, 1946
Patent expires December 21, 1964

3 Claims. (Cl. 20—75)

The present invention relates to a method for making wooden structural elements, in particular floorcovering slabs and to a wooden structural element made according to this method, in particular a floor-covering slab.

According to the method of the invention, matchwood splints, running parallel to each other, are laid together, and after a binding means has been brought between them, shaped under pressure into a formed piece, which is then dried.

The wooden structural element made according to the method is characterized by its being composed of numerous matchwood splints joined together by a binding means.

Figure 1:
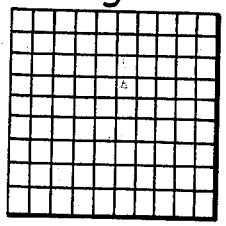
Figure 2:
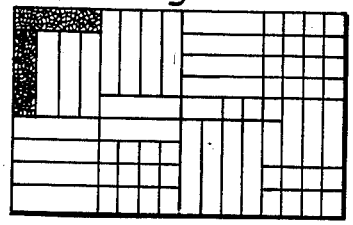
Figure 3:
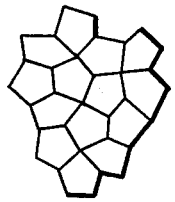
Figure 5:
Figure 4:
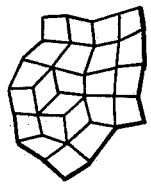
Figure 6:
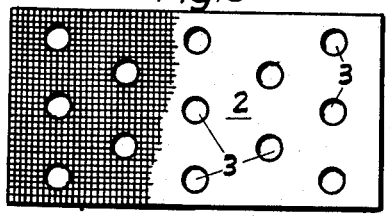
Figure 7:
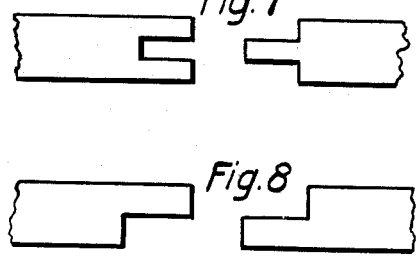
Figure 8:
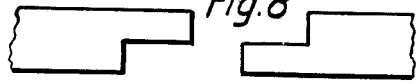
Figure 9:
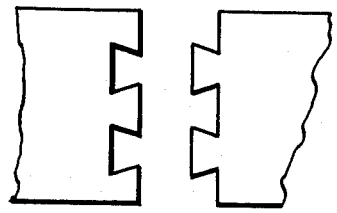
Figure 10:
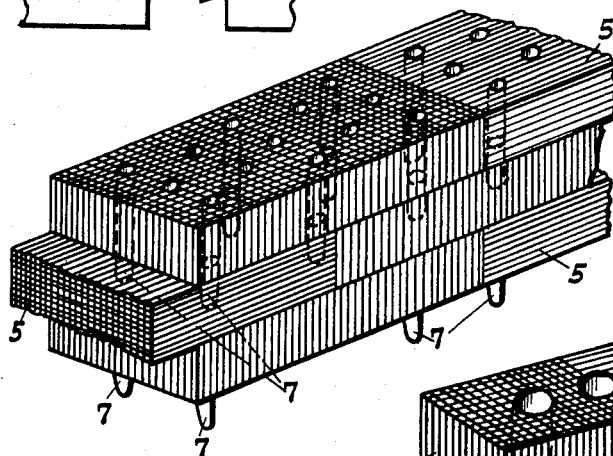
Figure 11:
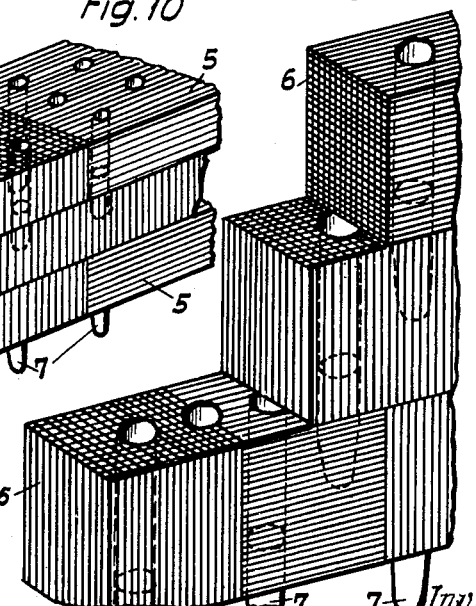
Figure 12:
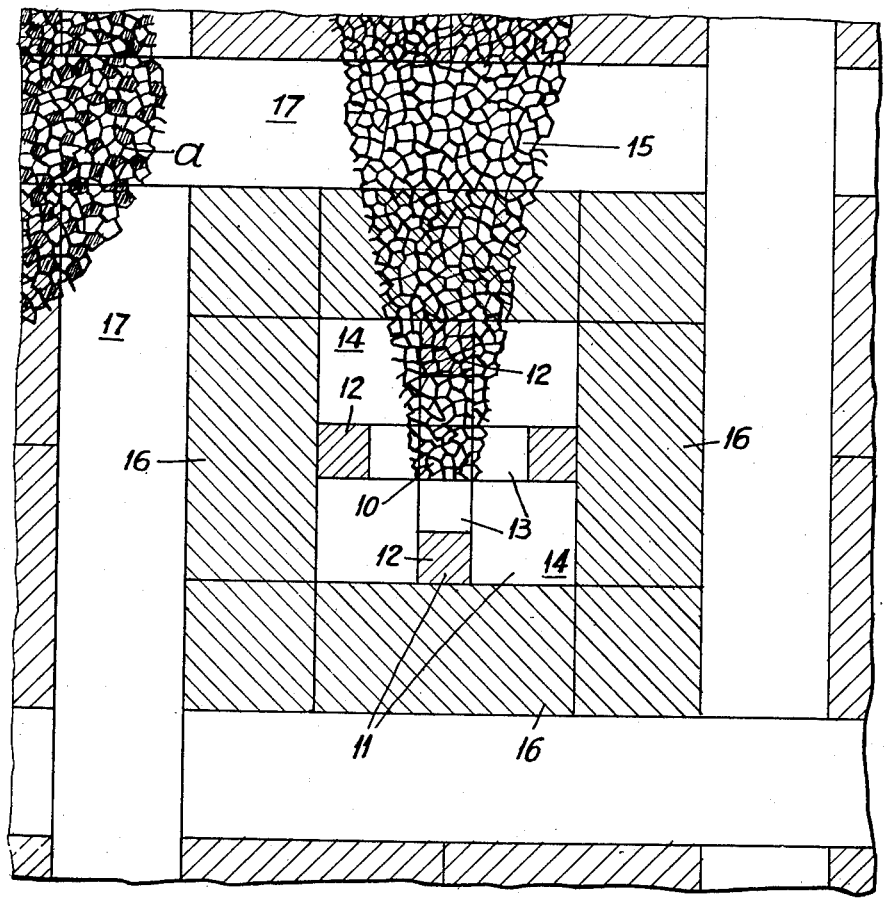

Some examples of execution of the wooden structural element made according to the method of the invention are illustrated in the drawing, where Fig. 1 illustrates a part of a slab-shaped wooden structural element seen from above, Fig. 2 is a plan view of a slab-shaped structural element composed of strip-shaped parts, Figs. 3 and 4 illustrate, on a larger scale and seen from above, two kinds of structural elements composed of matchwood splints, Figs. 5 and 6 show in elevation and plan a slab-shaped structure element, Figs. 7, 8 and 9 are end elevational views of jointing means for connecting slab-shaped structural elements, Figs. 10 and 11 are perspective views of parts of walls made of slab-shaped or block-shaped structural elements, Fig. 12 is a plan view illustrating, as the principle example of the adoption of a structural element according to the invention, a part of a floor made of slab-shaped structural elements.

For carrying out the method, in order to make the wooden structural elements according to the invention, splints of matchwood, of a sectional area of about 0.062 square inch or less lead parallel to each other are—after a binding means, for instance glue, or tar, or synthetic resin putty, has been brought between them, pressed together mechanically, so that the splints and the binding means form a compact mass. The pressed article may receive immediately the form of a slab or a block, and after drying hard be smoothed and if necessary polished.

The slabs, in particular floor slabs, may however also be obtained by cutting a block through at right angles to the longitudinal direction of the matchwood splints.

The pressed piece thus obtained may, according to the degree of pressure applied and to the cross-section of the matchwood splints, be given a varied appearance on the surface formed by the ends of these splints. Moderately-pressed splints of square cross-section give an end picture as illustrated in Fig. 1, i. e. the splints maintain their original square form of cross-section. Fig. 3 shows a view from above on a slab composed of matchwood splints pentagonal in cross-section, and obtained by moderate pressing. Fig. 4 shows the result of adopting a strong pressing pressure on matchwood splints which were originally of square cross-section. As can be seen, the splints finally receive a rhombus-shaped cross-section. The cross-section of the matchwood splint may also have as many sides as desired. Depending on the pressing pressure, the cross-section of each individual matchwood splint consequently changes, and all these cross-sections together give a more or less changed appearance to the surface of the structural element, the surface being that formed by the ends of the splints.

The pressed pieces may be composed to form large-sized slabs or blocks, as for instance shown in Fig. 2, or according to which a slab is composed of square and strip-shaped individually pressed pieces. Figs. 5 and 6 show a slab-shaped structural element formed like a brick. In this the end surfaces of matchwood splints 1, set closely together and glued to each other, form the two flat sides 2 of the slab. In order that these structural elements may be kept mutually together in bond when being laid, they are provided with parts 4 projecting from one side of a slab surface 2. These parts 4, which may be of any desired cross-section, are made by directly pushing separate bundles of matchwood splints out of the plate, so that hollow spaces 3 become free and into them the projecting parts 4 of a plate laid over the plate in question can be inserted.

The joining of edges, ends and/or side surfaces, of the plates or blocks together may be effected also by tongue and groove (Fig. 7), by over-lapping (Fig. 8) or by dovetailing (Fig. 9).

As can be seen from Fig. 10, slab-shaped elements 5, with matchwood splints arranged parallel to the slab surfaces and glued and pressed together, alternately with the structural elements as in Fig. 5, can be adopted for forming walls. It is also possible, as shown in Fig. 11, for blocks 6 to be used which are composed in one part of vertically arranged matchwood splints, and in another part of horizontally arranged splints, parts 7 being pushed out of the material of the elements just as in Figs. 5 and 6, and recesses being thereby caused for receiving the mutual securing pins.

The floor shown in Fig. 12 consists in fact of elements made of matchwood splints made of light-coloured and dark-coloured woods. All the splints are arranged parallel to each other in such a way that their end surface forms the actual surface of the floor. It would, however, also be possible to use wood all of the same colour. The innermost part 10 of the middle piece 11 of the illustrated section of the floor is a slab made of dark matchwood splints, as are also the floor slabs 12, whilst the slabs 13 and the large slabs 14 of the middle piece consist of light-coloured matchwood splints. As can be seen from the partial pattern 15, the elements used consist of matchwood splints of pentagonal cross-section, standing vertical to the slab surface. Rectangular slabs 16 and strips 17 of the same material and the same make enclose the middle piece 11.

To enliven the appearance of floor, ceiling or wall slabs, elements with matchwood splints of different colours of wood may be used. For then marble, or coloured mosaic, or other motives may be adopted.

It is easy to see that it is the surfaces composed of the ends of the matchwood splints which are the most resistant to wear, and this circumstances must be taken into account when the purpose for which the elements are intended is being considered.

From the described elements it is possible to make not only surface coverings, such as are suitable for floors, ceilings, walls, etc., but also the whole walls of buildings.

The matchwood splints, which are adopted, may be of any kind of soft or hard wood.

The described elements practically do not warp under the influence of moisture if a waterproof putty or glue impregnating the matchwood splints is used, so that no working of the elements under the effect of changing temperature and moisture is to be feared.

What I claim is:

1. A method of making wooden covering slabs for walls and floors, consisting in arranging wooden splints in the form of match splints having corresponding dimensions parallel to each other and with the fibres of the splints running lengthwise thereof, impregnating the splints with a waterproofing and binding medium and exerting a heavy pressure on the splints to cause them to change their shape in cross section and to lie close together and form a slab.

2. The method of making wooden slabs for walls and floors, consisting in arranging a plurality of wooden splints in the form of match splints in parallel relation with each other and with the fibres thereof running lengthwise, impregnating the splints with a waterproofing and binding medium, pressing the splints together to form a slab and displacing relatively small bundles of the splints at suitable points vertically of the slab to provide recesses and projections for interengagement with recesses and projections on adjacent slabs.

3. A covering slab for walls and floors, comprising a plurality of wooden splints in the form of match splints arranged parallel to each other and having the fibres thereof extending longitudinally, means for binding the splints together to form a slab, and certain of the splints being displaced longitudinally of their lengths in relatively small bundles to provide projections and leave recesses for engagement with corresponding projections and recesses on adjacent slabs.

References Cited in the file of this patent

UNITED STATES PATENTS

| | | |
|---|---|---|
| 26,898 | De Forest | Jan. 24, 1860 |
| 436,041 | Kossul | Sept. 9, 1890 |
| 711,541 | Standau | Oct. 21, 1902 |
| 1,028,703 | Fulton | June 4, 1912 |
| 1,078,776 | Dunton | Nov. 18, 1913 |
| 1,702,185 | Weber | Feb. 12, 1929 |
| 1,976,969 | Soukup | Oct. 16, 1934 |
| 1,994,204 | Walls | Mar. 12, 1935 |
| 2,062,590 | Lundquist | Dec. 1, 1936 |
| 2,218,288 | Long | Oct. 15, 1940 |
| 2,399,124 | Kahr | Apr. 23, 1946 |

FOREIGN PATENTS

| | | |
|---|---|---|
| 331,189 | Great Britain | June 23, 1930 |
| 260,924 | Switzerland | Apr. 15, 1949 |
| 139,907 | Sweden | Apr. 14, 1953 |